United States Patent [19]

Ohlson

[11] 3,757,234

[45] Sept. 4, 1973

[54] FUNCTION GENERATOR

[75] Inventor: Gunnar F. Ohlson, Rockford, Ill.

[73] Assignee: International Telephone and Telegraph Corporation, Monterey Park, Calif.

[22] Filed: Dec. 27, 1971

[21] Appl. No.: 212,428

Related U.S. Application Data

[63] Continuation of Ser. No. 70,186, Sept. 8, 1970, abandoned.

[52] U.S. Cl. .................. 328/142, 307/229, 328/145

[51] Int. Cl. .......................................... H03k 17/00

[58] Field of Search .................... 328/142, 148, 143, 328/145; 307/229, 230; 235/197

[56] References Cited

UNITED STATES PATENTS 3,550,020 12/1970 Gill et al. ........................ 307/299 X 3,486,114 12/1969 Sitton .............................. 328/142 X 3,436,559 4/1969 Wajs .............................. 328/142 X 3,622,770 11/1971 Edelson ............................ 235/197

*Primary Examiner*—John W. Huckert

*Assistant Examiner*—B. P. Davis

*Attorney*—C. Cornell Remsen, Jr., T. E. Kristofferson et al.

[57] ABSTRACT

A plurality of amplifiers have their outputs connected with an input signal to an analog adder. The amplifiers are disabled successively by a clamp. The adder output voltage versus input voltage curve is then a continuous function of contiguous straight line segments which increase or decline in slope in a steplike fashion. Function generator operation is insensitive to temperature and temperature changes produce no errors as in the prior art. The nonlinear voltage-current characteristic curve of the clamping diodes has no deleterious effect on function generator operation as in the prior art.

16 Claims, 13 Drawing Figures

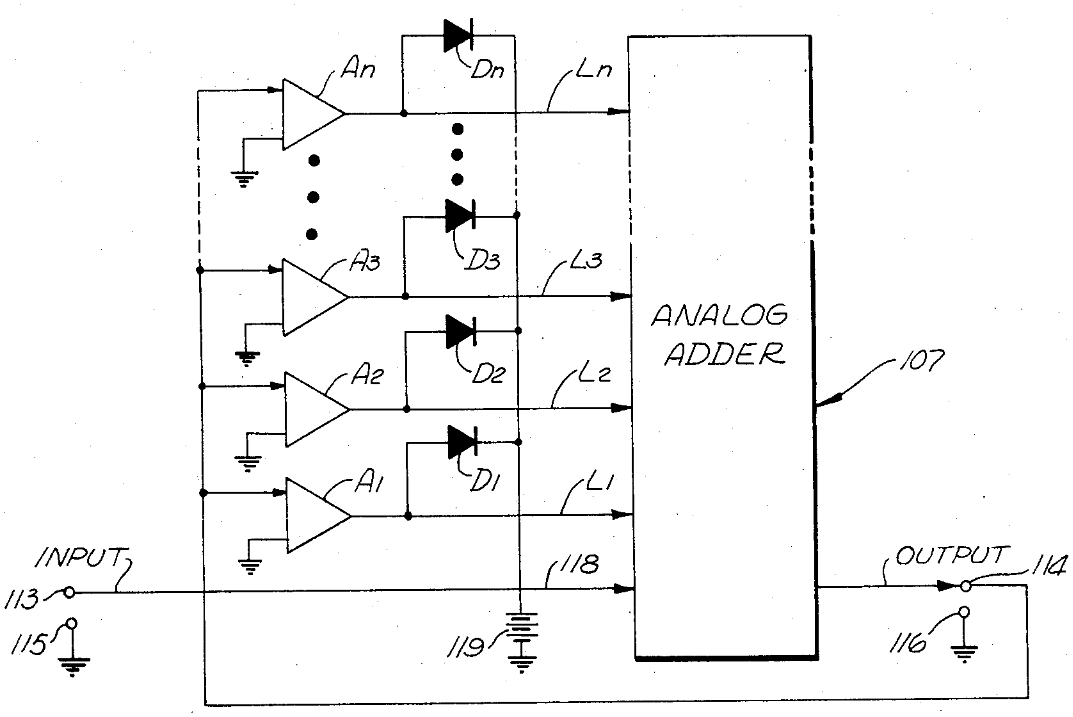
Fig. 6.
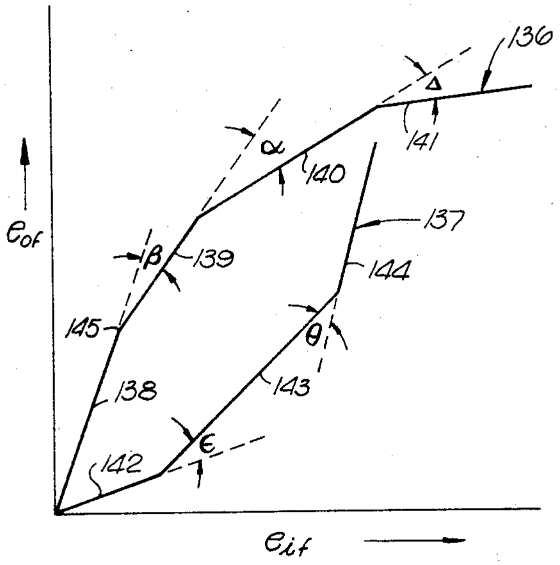
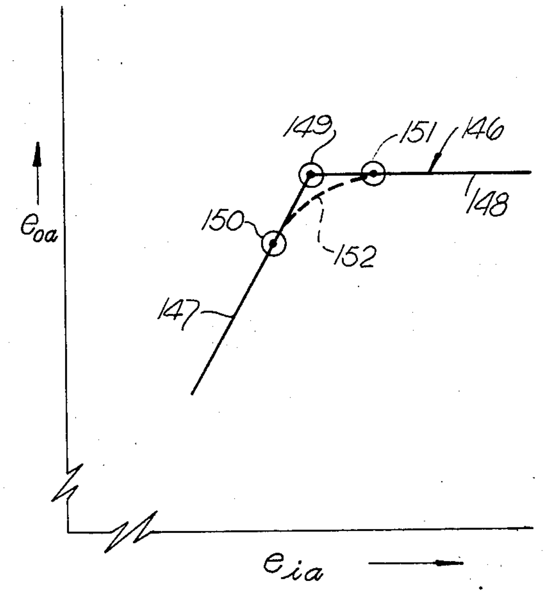
Fig. 7. Fig. 8.

PATENTED SEP 4 1973 3,757,234

SHEET 3 OF 3

FUNCTION GENERATOR

This application is a continuation of copending application Ser. No. 70,186 filed Sept. 8, 1970, and now abandoned for SQUARE ROOT EXTRACTOR. The benefit of the filing date of said copending application is, therefore, hereby claimed for this application.

BACKGROUND OF THE INVENTION

This invention concerns nonlinear function generators, and more particularly, to function generators of the approximately straight line segment type.

Frequently, it it necessary or desirable to convert an input current or voltage to an output which is a nonlinear function of the input. An example is the conversion of an input proportional to the pressure difference across an orifice into an output proportional to the flow through the orifice. This involves extracting the square root of the input. The present invention is by no means limited to this application although it has been found to have considerable utility therein.

In the past, several different types of function generators employing straight line segments have been used. In one type zener diodes or biased diodes were used in circuits to inhibit current until plural corresponding threshold voltages were exceeded. By judicious choice of threshold voltages and scaling factors, curves without substantial inflection could be approximated. Inaccuracies result from the use of these prior art function generators. This for the reason that diode resistance changes due to changes in temperature. Further, the forward voltage drop across these is nonlinear with current.

SUMMARY OF THE INVENTION

In accordance with the device of the present invention, the abovedescribed and other disadvantages of the prior art are overcome by providing means to generate an output signal by the use of clamping diodes. The clamping action is, thus, insensitive to temperature changes as in the prior art. Operation is also unaffected by the nonlinear voltage-current characteristic curve of the clamping diodes when they are forward biased, whereas such nonlinearity was a disadvantage of the prior art function generators.

Precise steps in the slopes of contiguous straight line segments of the output voltage versus input voltage curve of the present invention are made possible. That is, the points joining the line segments are called break joints herein.

One advantage of the invention may be expressed another way. Precise break points are made possible by freedom from the effects of temperature sensitivity in the diodes.

According to the present invention, break points may also be precisely and easily set without having any affect on other break points.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 6 is a block diagram of an alternative embodiment of the present invention;

FIG. 7 is a graph of an output versus input characteristics of the function generator of the present invention;

FIG. 8 is a graph illustrating an output versus input operating characteristic of amplifier means shown in FIGS. 1 and 6.

DESCRIPTION OF THE PREFERRED EMBODIMENTS

Figure 1:
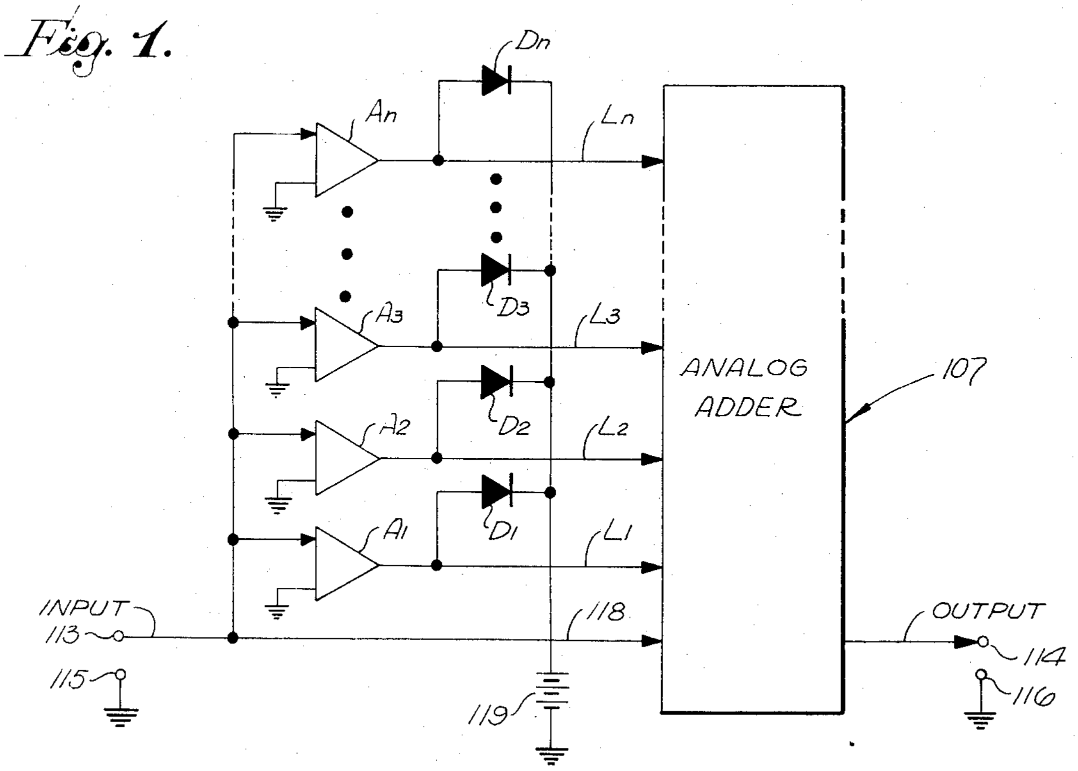
FIG. 1 is a block diagram of one embodiment of the present invention.

In the drawings in FIG. 1, a pair of input terminals are indicated at 113 and 115, input terminal 115 being grounded. A pair of output terminals 114 and 116 are also provided in FIG. 1, output terminal 116 being grounded.

Output terminal 114 receives the output of an analog adder 107. Adder 107 may be entirely conventional. Adder 107 receives an input by a lead 118 connected from terminal 113.

A plurality of amplifier means A1, A2, A3 ... An are provided respectively with output leads L1, L2, L3 ... Ln. The output leads L are connected as inputs to adder 107. Amplifier means A receive an input from terminal 113.

Also shown in FIG. 1 are diodes D1, D2, D3 ... Dn respectively corresponding to amplifier means A1, A2, A3 ... A*n*.

In FIG. 1, preferably the number of diodes D is equal to the number of amplifier means A. Of course, the number of leads L will always be equal to the numer of amplifier means A. There may be any number of amplifier means A. A single amplifier means A is also possible in some cases, but, in general, at least two will be preferable. Moreover, a more accurate approximation of a known curve is possible by using a greater number of amplifier means A.

Source of potential means 119 are connected from the cathodes of all of the diodes D to ground.

Figures 2, 3:
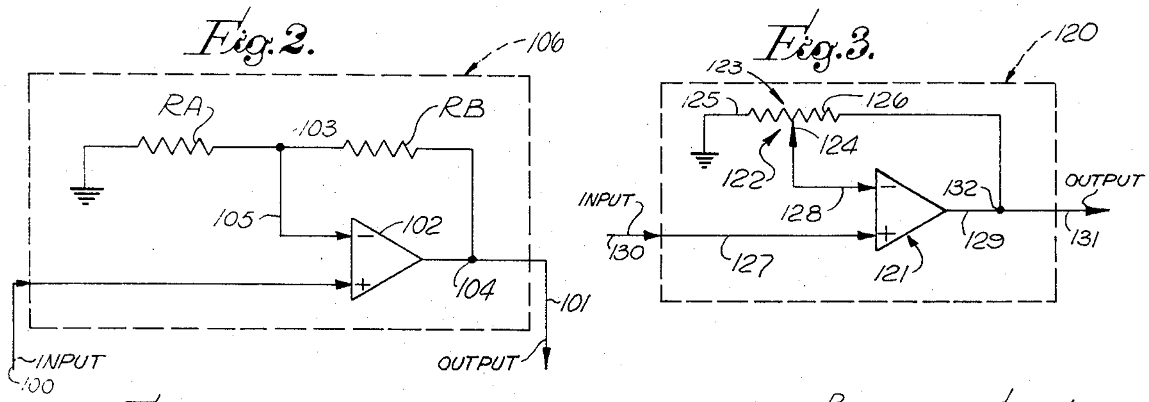
FIG. 2 is a schematic diagram of amplifier means which may be employed in the embodiment of FIG. 1.
FIG. 3 is a schematic diagram of alternative amplifier means which may be employed in the embodiment of FIG. 1.

Amplifier means 106 is shown in FIG. 2 including an input lead 100, an output lead 101, a differential amplifier 102 and resistors RA and RB having resistances, $R_a$ and $R_b$, respectively. Resistors RA and RB are connected in series in that order from output lead 101 to ground. Resistors RA and RB have mutually joined ends at a junction 103. Input lead 100 is connected to the noninverting input of amplifier 102, hereinafter sometimes referred to as the plus input. The output of amplifier 102 is connected to output lead 101 at a junction 104 to which the other end of resistor RB is also connected. Junction 103 is connected to the inverting input of amplifier 102, sometimes referred to herein as the minus input.

Amplifier means A1, A2, A3 ... An may all be identical to amplifier means 106, if desired, although the resistor resistances of any one of the amplifier means Ak may all be different from those of each of the others, where $k$ is 1, 2, 3 ... or $n$.

In order to understand the operation of the present invention, a perfectly clear understanding of the operation of a differential amplifier is desirable. The same is true of the operation of amplifier means 106.

Typically, a positive increase in a positive voltage impressed upon the plus input of a differential amplifier will cause its output to increase. Thus, $e_{od} = Ge_{id}$ where $e_{od}$ is the output voltage, $e_{id}$ is the plus input voltage and $G$ is a constant which is called the gain of the amplifier. All this happens when the potential of the minus input remains constant. The output decreases (same gain) when a positively increasing positive voltage is applied to the minus input. When both inputs vary, $$e_{od} = G\ (e_{ip} - e_{im})$$

where $e_{ip}$ is the plus input voltage and $e_{im}$ is the minus input voltage. Notice the voltage difference. Hence, the name "differential" amplifier.

Typically, the gain of a differential amplifier may be 100,000, although lower values are possible and higher values even more likely.

With the connection of differential amplifier 102, the use of resistors RA and RB may be made to reduce and/or adjust the usually very high gain. The output of amplifier 102 is connected to its minus input from junction 104 through resistor RB and a lead 105 from junction 103. This means that if the plus input voltage varies, amplifier 102, e.g., with a gain, G, of 100,000 and, therefore, enough umph behind it, will immediately push enough current through resistor RB in a direction from junction 104 to junction 103 to drive the potential of junction 103 to that of the plus input. (Note that the amplifier 102 with relatively large gain, $G$, will tolerate only an infinitesima difference between the plus and minus input potentials.) Some finite difference is required for operation, but this is only about $1/G \times 100$ percent of the plus input voltage. Since $1/G \times 100$ percent is only one one-thousandth of one percent when $G = 100{,}000$, it will be understood that, truly, one may assume the potential at junction 103 to be equal to that on input lead 100.

If the amplifier 102 pumps current through resistor RB, where does that current go? The minus input impedance is very, very large and may be considered infinite for all practical purposes. All the RB current must, thus, effectively flow through RA. Thus, $$e_{id}/R_a = e_{od} - e_{id}/R_b$$

Then, $$e_{id}\ (1/R_a + 1/R_b) = e_{od}/R_b$$

Thus, $$e_{od}/e_{id} = (1 + R_b/R_a)$$

Then, the gain, $G$, of amplifier means 116 is $$G = (1 + R_b/R_a)$$

In FIG. 3, amplifier means are indicated at 120 including a differential amplifier 121, and a potentiometer 122. Potentiometer 122 includes a winding 123 and a wiper 124. Winding 123 has a portion 125, as viewed in FIG. 3, on the left hand side of wiper 124. Winding 123 also has a portion 126 on the right hand side of the wiper 124, as viewed in FIG. 3. The left hand side of winding 123 is connected to ground. Amplifier 121 has a plus input 127, a minus input 128 and an output 129. Plus input 127 is connected from an input lead 130. Output 129 is connected to an output lead 131. Potentiometer wiper 124 is connected to the minus input 128. The right end of winding 123 is connected to the amplifier output 129 at a junction 132.

In accordance with the foregoing, it will be noted that effectively, the circuit of FIG. 3 is identical to the circuit of FIG. 2 with wiper 124 mounted in a fixed position. The function generator of the present invention is not limited to the use of potentiometer 122. However, it may be found more useful and versatile when each of the amplifier means A incorporate a potentiometer such as potentiometer 122.

Further, for purposes of definition, the phrase "means providing resistance" is hereby defined to include, but not be limited to, any one of the following circuit elements: RA, RB, portion 125 of potentiometer winding 123, and portion 126 of winding 123.

Figure 4:
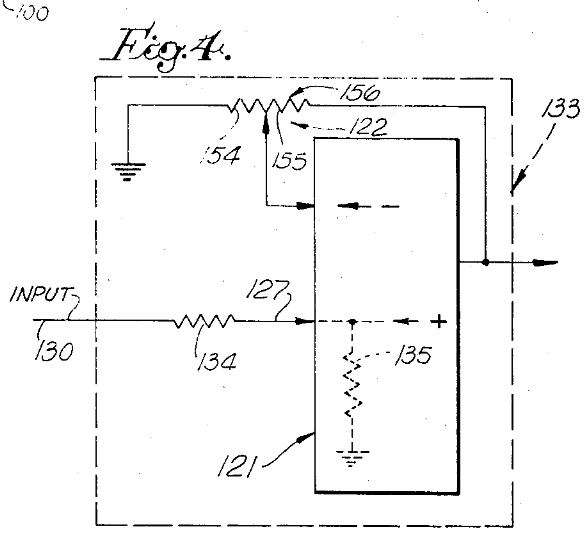
FIG. 4 is a schematic diagram of still another alternative amplifier means which may be employed in connection with the embodiment of FIG. 1.

Alternatively, amplifier means 133 are shown in FIG. 4. FIG. 4 may be identical to amplifier means 120, shown in FIG. 3, except for the addition of a resistor 134 connected in series between input lead 130 and plus input lead 127 of amplifier 121. The input impedance is generally very high. For example, it may be in the megohm region. Resistor 134 with input impedance 135 can thus serve to provide tailoring, if desired. Resistor 134 with the input impedance 135 can act simply as a voltage divider.

Figure 5:
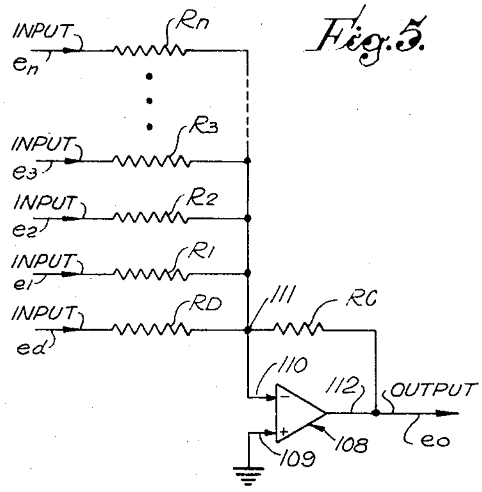
FIG. 5 is a schematic diagram of an analog adder.

A schematic diagram of adder 107 is shown in FIG. 5. As stated previously, adder 107 may be entirely conventional. However, a review of certain fundamental concepts regarding the type of addition performed may be helpful.

In FIG. 5, a differential amplifier 108 is shown having a grounded plus input 109, a minus input 110 connected to a summing junction 111, and an output 112 connected to junction 111 by a feedback gain control resistor RC.

A resistor RD is connected from input terminal 113 to junction 111. Resistors R1, R2, R3 ... R$n$ are connected respectively from the outputs of amplifier means A1, A2, A3 ... A$n$ to junction 111.

To understand the adding function of adder 107, shown in FIG. 5, assume that each of the resistors R1, R2, R3 ... R$n$ have the same resistance, $R$. Also assume that the resistance of resistor RD is $R_d$, the resistance of resistor RC is $R_c$ and $R_d = R$. (None of these conditions is necessary to practice the present invention.)

As before, the substantial gain of amplifier 108 will drive the minus input potential down to that of the plus input potential. However, in FIG. 5, the plus input potential is ground. The potential of junction 111 is, thus, effectively ground. As before (for the potentials, $e$, see FIG. 5), $$e_o/R_c = e_d/R_d + e_1/R + e_2/R + e_3/R + \ldots e_n/R$$

But, $R_d = R$, thus $$e_o = R_c/R\ (e_d + e_1 + e_2 + e_3 + \ldots e_n)$$

Thus, the summation. The gain may be changed by changing $R_c$. Thus, $R_c$ may be made variable, if desired, for adjustable span. Zero can be supplied by any conventional bias means.

The embodiment of FIG. 6 is identical to that of FIG. 1 except that amplifiers A have their inputs connected from output terminal 114 rather than from input terminal 113, as in FIG. 1. If in both FIGS. 1 and 6, the voltage across input terminals 113 and 115 is $e_{if}$, and the voltage across output terminals 114 and 116 is $e_{of}$, then the rate of change of $e_{of}$ with respect to $e_{if}$ may be defined as $D$. For FIG. 1, $D = D_1$, the overall gain is thus $$D_1 = -R_c/R\ (1 + K_1 + K_2 + K_3 + \ldots K_n) \qquad (A)$$

This assumes that all amplifiers are operating in their linear regions. Thus, amplifier means A1, A2, A3 ... An have gains $K_1$, $K_2$, $K_3$ ... $K_n$, respectively. The gain, $D_1$, which is the slope of curve 136 in FIG. 7, is, thus, the sum of all the $K$ gains times the summing circuit gain of $R_c/R$. The "1" appears in $(1 + K_1 \ldots)$ because the input on terminal 113 is connected to junction 111 by resistor RD but not through an amplifier (effective unity gain). The $K$'s are bilevel. They are a constant maximum or zero. They drop out one at a time.

For FIG. 6, $D = D_2$, the overall gain, and $K_s = K_1 + K_2 + K_3 + \ldots K_n$.

$$R_c/R\ (e_i + K_s e_o) = -e_o$$

where, $e_i$ is the voltage across input terminals 113 and 115, and $e_o$ is the voltage across output terminals 114 and 116.

Thus, $de_o/de_i = D_2$, which is the slope of curve 137 in FIG. 7, and $$-R/R_c\ D_2 - K_s D_2 = 1 \text{ and}$$

$$D_2 = -1/R/R_c + K_s \qquad (B)$$

Note that $D_1$, equation (A), decreases as the $K$'s drop out. $D_2$ increases as the $K$'s drop out ($K_s$ gets smaller).

The function generator of FIG. 1 will produce an output voltage, $e_{of}$, which is a function of the input voltage, $e_{if}$, as indicated at 136 in FIG. 7. The input voltage $e_{if}$ is, thus, impressed upon input terminal 113 in FIG. 1. The output voltage appears at terminal 114 in FIG. 1. Corresponding voltages also appear at these same terminals in FIG. 6. However, in FIG. 6, the output voltage, as a function of the input voltage, is indicated at 137 in FIG. 7.

In connection with curve 136, note that curve 136 is made up of straight line segments 138, 139, 140 and 141.

Curve 137 is made up of straight line segments 142, 143 and 144.

In connection with curve 136, what happens is that the K terms in equation (A) are bilevel (have only two levels—maximum or zero). Thus, each K term falls to zero in succession as $e_{if}$ increases. (Absolute values used throughout.) The drop in a K value is made substantially in a step function fashion from a finite positive value larger than zero to zero. Thus, where line segments 138 and 139 meet at a point 145, as $e_{if}$ increases, one amplifier output has been clamped to the potential of the positive pole of battery 119 and has, more or less, been rendered inoperative. It no longer amplifies to any substantial extent. The corresponding gain term K in equation (A) no longer appears there. It has dropped out. It is zero.

Equation (A) also shows that the overall gain, $D_1$, of the function generator is a function of the sum of the gains of each of the amplifier means A. $D_1$, thus, declines with cecreasing K's. Each amplifier means A drops out in succession depending upon the gain thereof. The gain thereof may be the same or different. If each amplifier means A is of the amplifier means 106 type shown in FIG. 2, the resistors corresponding to the resistors RA and RB in each amplifier means shown in FIG. 1 may be different.

In accordance with the foregoing, the slope of line segment 138 is equal to the right hand side of equation (A), where none of the K terms are equal to zero.

It, thus, appears that the gain drop out function of clamping the amplifier means A is what contributes to the change in slope of the different line segments of curve 136. The discrete changes in slope are indicated by angles $\beta$, $\gamma$ and $\Delta$.

As stated previously, the slope of line segment 138 is equal to the right hand side of equation (A). Thus, when all of the amplifier means A have their outputs clamped, and if $R = R_c$, $D_1 = -1$. The eventual lower slope limit of curve 136 in that case, then is unity. The same is true in the case of $D_2$.

Figure 13:
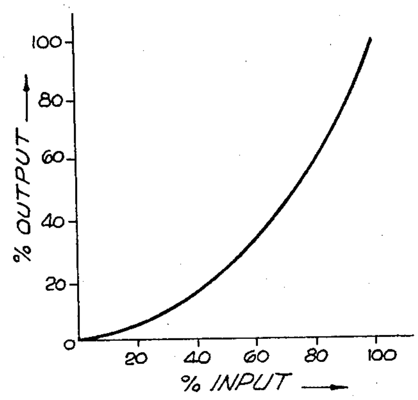
FIG. 13 is a graph of the percent output versus percent input for a square function generator, which is typical of the curves approximated by the circuit of FIG. 12.

The embodiment of FIG. 6 operates similarly. Instead of supplying amplifier means A with an input from terminal 113, as in FIG. 1, in FIG. 6, output terminal 114 is connected to the inputs of amplifier means A. Curve 137 in FIG. 7, thus, results. Curve 137 is likewise a step function type curve where, when the output of each amplifier means A is clamped in succession, line segments 142, etc., are formed. As will be understood, the characteristic curve of FIG. 13 is only approximate. The true curve of FIG. 13 is not actually a smooth curve, but involves step functions of the type illustrated at 142, 143, 144, etc., in FIG. 7. Note in equation (B), $K_s$ is the sum of the amplifier means gains. Thus, as each individual amplifier means gain is lost or reduces from its unclamped finite value to zero, $D_2$ increases in a stepwise fashion whereas $D_1$ increased. Note that the K's are in the numerator in equation (A) and in the denominator in equation (B). See $K_s$. The amplifier means provide negative feedback. They are connected to the inverting input of the adder amplifier. The discrete line segment slope steps are indicated in relation to the line segments of curve 137 at $\epsilon$ and $\theta$.

In FIG. 8, the output voltage of one amplifier means is indicated at $e_{oa}$. The input voltage thereto is indicated at $e_{ia}$. The curve on this graph is indicated at 146. It has two substantially straight line segments 147 and 148. These are joined at a point 149. Curve 146, including both of the line segments 147 and 148, are idealized. These characteristic curves occur only if the clamping diode is perfect and has zero resistance when forward biased and an infinite resistance when reverse biased. However, even practical diodes are close to ideal diodes. The curve 146 is on a greatly enlarged scale. Thus, even though the scale is large, the practical curve 152 differs from the ideal curve very little. Dotted line 152 is slightly convex in an upward direction, as viewed in FIG. 8.

The type of amplifier means of differential amplifier disclosed herein may be said to be saturated when the voltage across a corresponding diode is zero. This may occur at point 150. However, the definition of "saturation" is rather loose as it is conventionally used in the art, and may be applied to the said type of amplifier means or differential amplifier at some point on line 152 somewhat above point 150. The true curve of FIG. 8 has no straight line portion 148 but is close thereto.

Figure 9:
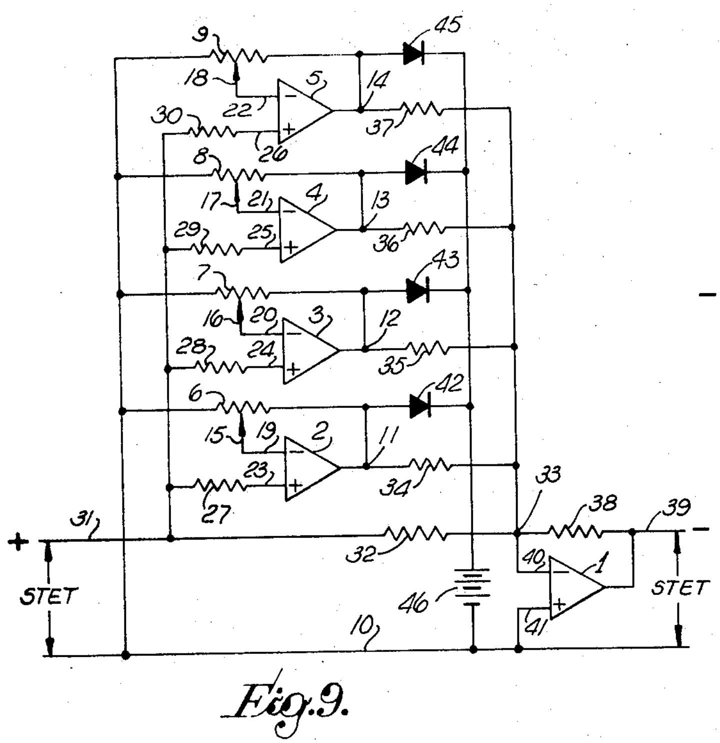
FIG. 9 is a circuit diagram of still another embodiment of this invention.

The function generator of FIG. 9, as shown, employs an operational amplifier 1 in a summer and four operational amplifiers 2, 3, 4 and 5 as noninverting gain stages. Means are provided by which the gains of the amplifiers 2, 3, 4 and 5 are fixed at different predetermined values Z11, Z33, Z44 and Z55, respectively. As shown, this is accomplished by setting the ratios of their input to feedback impedances as by the potentiometers 6, 7, 8 and 9, respectively. The potentiometers are connected between a reference voltage conductor 10 and the respective output terminals 11, 12, 13 and 14 of the gain stages. The wipers 15, 16, 17 and 18 of the potentiometers are connected to respective inverting input terminals 19, 20, 21 and 22 of the gain stages. The noninverting input terminals 23, 24, 25 and 26 are joined through respective input resistors 27, 28, 29 and 30 to an input conductor 31. Resistor 32, serving as a scaling resistor, is connected between the input conductor 31 and a summing junction 33. Additional scaling resistors 34, 35, 36 and 37 are connected between the output terminals 11, 12, 13 and 14, respectively, and the summing junction 33. A feedback resistor 38 is connected between output conductor 39 and the summing junction 33, which is joined to the inverting input terminal 40 of amplifier 1. The noninverting input terminal 41 of amplifier 1 is connected to the reference voltage conductor 10.

Figure 10:
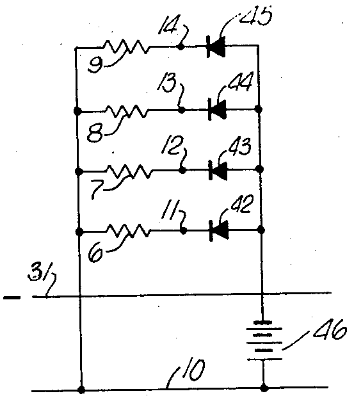
FIG. 10 is a fragmentary circuit diagram showing a modification of FIG. 9.

Means are provided to limit the branch voltages E11, E12, E13 and E14 produced at output terminals 11, 12, 13 and 14, respectively, with respect to the reference voltage on conductor 10 to predetermined saturating voltages V11, V12, V13 and V14, respectively. As shown, the saturating voltages V11, V12, V13 and V14 are all the same value, but this is not required. Diodes 42, 43, 44 and 45 are connected to the respective terminals 11, 12, 13 and 14 to divert current from the scaling resistors 34, 35, 36 and 37 when the voltage at the terminals reach the saturating values V11, V12, V13 and V14 so that these voltages are maintained as limits. In the embodiment of FIG. 9, all of the saturating voltages V11, V12, V13 and V14 are established by a reverse bias potential source 46 (shown as a battery) connected between the conductor 10 and each of the diodes 42, 43, 44 and 45, which may be matched for forward voltage drop. The saturating voltage is the sum of the reverse bias potential V40 and the forward voltage drop of the matched diodes. When the signal reeived on input conductor 31 is positive with respect to the reference voltage, the diodes and bias potential source are poled as shown in FIG. 9. When the signal is negative with respect to the reference voltage, the diodes and bias potential source are poled as shown in FIG. 10, while all other connections are made as shown in FIG. 9. The diodes and bias potential source of FIG. 10 could be added to FIG. 9 to accommodate input signals of either polarity.

If we let $I32$, $I34$, $I35$, $I36$, $I37$ and $I01$ represent the currents through resistors 32, 34, 35, 36, 37 and 38, respectively, the summation of the currents entering and leaving the summing junction 33 is shown by the equation:

$$I_o = I32 + I34 + I35 + I36 + I37 \tag{1}$$

As stated previously, in an operational amplifier such as 1, there is effectively no potential difference between the input terminals 40 and 41, so, if we let $R32$, $R34$, $R35$, $R36$, $R37$ and $R38$ represent the resistances of resistors 32, 34, 35, 36, 37 and 38, respectively, $E_i$ represents the input signal voltage measured between input conductor 31 and reference conductor 10, $E39$ represents the voltage between summing junction 33, or the reference conductor 10, and output conductor 39, and $E_o$ represents the output signal voltage measured from output conductor 39 to the reference conductor 10, equation (1) may be rewritten as:

$$E39/R38 = -E_o/R38 = E_i/R32 + E11/R34 + E12/R35 + E13/R36 + E14/R37 \text{ or}$$

$$E_o = -R38\ (E_i/R32 + E11/R34 + E12/R35 + E13/R36 + E14/R37) \tag{2}$$

This equation is the equation of a scaling summer, which will be recognized as comprising amplifier 1 and the resistors 32, 34, 35, 36, 37 and 38.

When the branch voltage at any of the output terminals 11, 12, 13 and 14 exceeds the corresponding saturating voltage $V11$, $V12$, $V13$ and $V14$, the diode 42, 43, 44 or 45 connected from that output terminal to the source 46 will conduct in the forward direction and prevent the voltage at that output terminal from exceeding the saturating voltage. The associated one of the amplifiers 2, 3, 4 and 5 is then sometimes said herein to be saturated. By adjusting the wipers 15, 16, 17 and 18 on the potentiometers 6, 7, 8 and 9, respectively, the amplifiers 2, 3, 4 and 5, respectively, may be made to saturate at different values of the input signal on conductor 31. None, some or all of the amplifiers 2, 3, 4 and 5 may be saturated at any given time, depending upon the value of the input signal. It will be apparent that when all of the amplifiers are saturated, equation (2) becomes:

$$E_o = -R38\ (E_i/R32 + V11/R34 + V12/R35 + V13/R36 + V14/R37) \tag{3}$$

Figure 11:
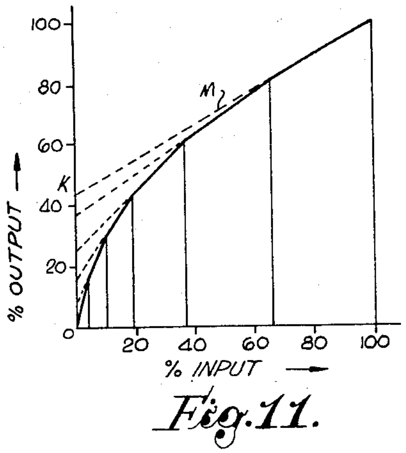
FIG. 11 is a graph of the present output versus percent input, showing the straight line segments in an approximate square root extractor. It is typical of curves generated by the circuits in FIGS. 9 and 10.

Since all of the $V$ and $R$ terms are constant, $$E_o = -R38/R32 \cdot E_i - K \tag{4}$$

where the constant $K = R38\ (V11/R34 + V12/R35 + V13/R36 + V14/R37)$. The output voltage $E_o$, therefore, varies only with the input voltage $E_i$, the slope M of the output versus input curve (as seen in FIG. 11) determined by the constant $R38/R32$, and the intercept K on the O axis. When $E11$ falls below the saturation voltage V11, while the other amplifiers remain saturated, equation (1) becomes:

$$E_o = -R38\ (E_i/R32 + E11/R34 + V12/R35 + V13/R36 + V14/R37) \tag{5}$$

Since $E11 = Z22 \cdot E_i$, equation (5) reduces to:

$$E_o = -R38\ (1/R32 + Z22/R34) \cdot E_i - K1 \quad (6)$$

which may be interpreted as above. As each successive amplifier becomes unsaturated, a new straight line segment is begun, each segment being determined as illustrated above. By judicious choice of saturation voltages, gains and sealing resistances, a wide variety of curves may be approximated, the accuracy of approximation also being dependent upon the number of straight line segments employed along, and especially in relation to the radius of curvature required.

Figure 12:
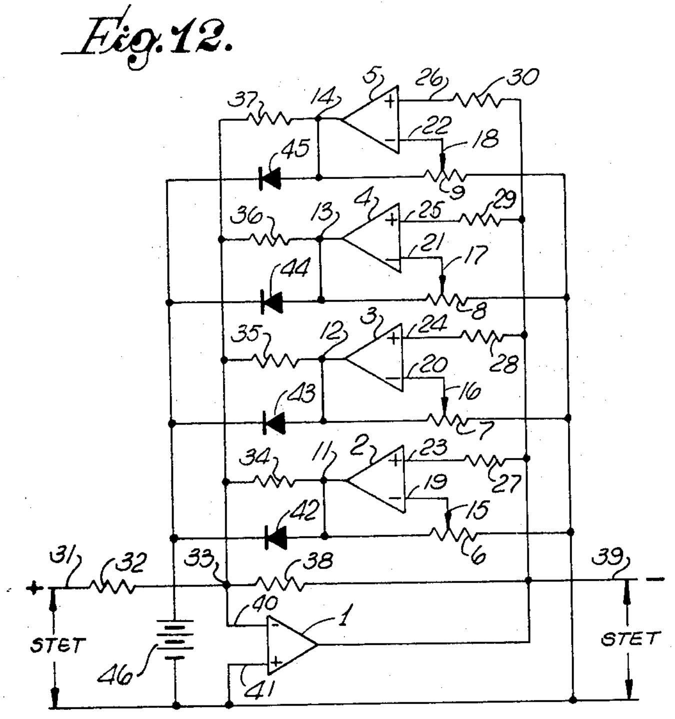
FIG. 12 is a circuit diagram of another embodiment of this invention.

FIG. 12 shows another embodiment in which corresponding components have been given the same reference numerals as in FIG. 9. In this species, the saturating gain amplifiers 2, 3, 4 and 5 are connected in parallel with the feedback resistor 38, now acting as a scaling resistor, while resistor 32 serves as the sole inverting input impedance to the summing amplifier 1. The output equation for this circuit is:

$$E'_o = -R38\ (-E_i/R32 + E11/R34 + E12/R35 + E13/R36 + E14/R37) \quad (7)$$

It will be noted that this is identical to equation (1) except for the sign on the $E_i/R32$ term. This shows that by plotting absolute values of output against input of FIG. 13, the curve would be concave upward instead of downward, as in FIG. 11. Once again, the polarity of the diodes 42, 43, 44 and 45 and of the battery 46 would be reversed, as in FIG. 10, if the polarity of the input signal were reversed.

With a fixed bias potential source 46, the amplifiers 2, 3, 4 and 5 may be adjusted to saturate at any desired values of the input voltage E31 by adjusting the wipers 15, 16, 17 and 18 to provide the gain required to cause saturation at such values. Each gain is adjustable independently of the others, permitting accurate setting of the break points in the output versus input curves.

While a battery is shown as the bias potential source 46, a regulated voltage source compensated for the effects of temperature on diodes 42, 43, 44 and 45 is generally used. It may be any of the applicable regulated voltage sources that are well known in the art.

It will be obvious to those skilled in the art to insert an inverting amplifier in any embodiment of the present invention if the output is to be of the same polarity as the input.

While scaling resistors are specified in the embodiments described, those skilled in the art will recognize that other impedances can be used in other embodiments including, but not limited to, those dependent upon shifts in frequency.

In some cases, individual diode back bias sources of potential may be substituted for batteries 119 and 46, one for one or more or each of the diodes shown in FIGS. 1, 6, 9, 10 and 12. In these cases, the diodes need not be uniformly poled. An analog adder will add (subtract) negative and positive voltages. In any event, two or more of the diodes may have a single source of potential connected thereto, and the rest may be connected any way disclosed herein. Further, all of the diodes shown in FIGS. 1, 6, 9, 10 and 12 may be poled in the opposite direction provided that suitable batteries 119 and 46 are poled in the opposite direction.

Optionally, in some cases, resistor 32 may be omitted.

In accordance with one feature of the present invention, in FIGS. 1, 4 and 5, resistor RD may be employed with one amplifier means 133, an adder 107 and the remainder of the amplifier means A omitted.

In accordance with another feature of the invention, in FIG. 9, resistor 32 may be omitted, and all the amplifier means other than those including amplifiers 2 and 3 omitted. Note will be taken that there are four amplifier means in FIG. 9 identical to amplifier means 133 shown in FIG. 4.

From the foregoing, it will be appreciated that one feature of the invention may be employed with any one or more or all of the other features without departing from the invention. Moreover, any one feature of the invention may be used by itself.

The phrase "amplifier means" is defined herein to include, but not be limited to, amplifier means 106 shown in FIG. 2, amplifier means 120 shown in FIG. 3, amplifier means 123 shown in FIG. 4, any of the amplifier means A, any amplifier and any differential amplifier disclosed herein.

The potentiometers disclosed herein are not absolutely necessary to the practice of the present invention. For example, note that there is no potentiometer in FIG. 2. However, potentiometers may be found useful in making the function generator of the present invention adjustable.

In accordance with the foregoing, the phrase "means to provide resistance" is hereby defined to include, but not be limited to, resistor RA, resistor RB, potentiometer winding portion 125, potentiometer winding portion 126, winding portion 154 of potentiometer winding 156, potentiometer winding portion 155 or potentiometer winding portions on opposite sides of wipers 15, 16, 17 and 18 shown in FIG. 9, or on opposite sides of wipers 15, 16, 17 and 18 shown in FIG. 12.

It is to be understood that neither the construction nor operating characteristics of any circuit component disclosed herein need be the same as that of any other circuit component so disclosed. Although uniformity in some respects may be helpful as regards one or more specific components, the invention is by no means limited to any particular uniformity in structures disclosed herein.

Gains of all the amplifiers and amplifier means disclosed herein may either all be the same or all different or a combination. However, the break points should all be at different locations. In some cases, this requires different gains for the amplifier means A of FIGS. 1 and 6 because the break point location is determined by the voltage of battery 119 and the amplifier means gain. It is undesirable (wasteful) to have two identical break points.

What is claimed is:

1. A function generator comprising: an input lead; an output lead; a reference conductor providing a point of predetermined reference potential; a main differential amplifier having noninverting and inverting inputs, and an output connected to said output lead, the noninverting input to said main amplifier being connected to said reference conductor; a summing junction; a main feedback resistor connected from said input lead to said summing junction; first amplifier means including a first auxiliary differential amplifier and first and second means to provide resistance; second amplifier means including a second auxiliary differential amplifier, and third and fourth means to provide resistance, each of said auxiliary amplifiers having noninverting and inverting inputs, and an output, the noninverting input of said first amplifier being connected to one of said leads, the noninverting input of said second amplifier also being connected to one of said leads; a first diode having anode and cathode electrodes, one of said first diode electrodes being connected from the output of said first amplifier; a second diode having anode and cathode electrodes, one of said second diode electrodes being connected from the output of said second amplifier; source of potential means connected between said reference conductor and the other diode electrodes, said diodes being poled in a direction to be back biased by said source of potential means, said first and second means being connected in series in that order from said reference conductor to said one electrode of said first diode, said third and fourth means being connected in series in that order from said reference conductor to said one electrode of said second diode, the inverting input of said first amplifier being connected at a point between said third and fourth means; and first and second auxiliary summing resistors connected from the respective outputs of said first and second amplifiers to said summing junction.

2. The invention as defined in claim 1, wherein the noninverting inputs of said first and second amplifiers are connected to the selfsame said one lead.

3. The invention as defined in claim 2, wherein said one lead is said input lead.

4. The invention as defined in claim 3, wherein each of said first and second means is a portion of a continuous resistive first winding, and a first wiper in slidable engagement with said first winding at said point between said first and second means, each of said third and fourth means being a portion of a continuous resistive second winding, and a second wiper in slidable engagement with said second winding at said point between said third and fourth means, said first winding and said first wiper forming a first potentiometer, said second winding and said second wiper forming a second potentiometer, said first and second wipers being of said first and second amplifiers, respectively.

5. The invention as defined in claim 4, including first and second input resistors connected from said input lead to the noninverting inputs of said first and second amplifiers, respectively, said first amplifier means having a gain different from that of said second amplifier means, said source of potential means being a single source of potential.

6. The invention as defined in claim 2, wherein said one lead is said output lead.

7. The invention as defined in claim 6, wherein each of said first and second means is a portion of a continuous resistive first winding and a first wiper in slidable engagement with said first winding at said point between said first and second means, each of said third and fourth means being a portion of a continuous resistive second winding, and a second wiper in slidable engagement with said second winding at said point between said third and fourth means, said first winding and said first wiper forming a first potentiometer, said second winding and said second wiper forming a second potentiometer, said first and second wipers being connected to the inverting inputs of said first and second amplifiers, respectively.

8. The invention as defined in claim 7, wherein each of said second input resistors connected from said input lead to the noninverting inputs of said first and second amplifiers, respectively, said first amplifier means having a gain different from that of said second amplifier means, said source of potential means being a single source of potential, said first amplifier means having a gain different from that of said second amplifier means, said source of potential means being a single source of potential.

9. The invention as defined in claim 3, wherein said first amplifier means has a gain different from that of said second amplifier means, said source of potential means being a single source of potential.

10. the invention as defined in claim 6, wherein said first amplifier means has a gain different from that of said second amplifier means, said source of potential means being a single source of potential.

11. A function generator comprising: first and second main input leads; first and second main output leads, said second main leads being connected together; an analog adder having at least first and second input leads, and an output lead connected to said first main output lead, said first main input lead being connected to said first adder input lead; amplifier means having an input and an output, said amplifier means input being connected from one of said first main leads, said amplifier means output being connected to said adder second input lead; and means to clamp said amplifier means output to a predetermined constant potential.

12. A function generator comprising: a main input lead; a main output lead; a reference conductor providing a point of predetermined reference potential; an analog adder having at least first and second input leads, a first reference lead connected to said reference conductor, and an output lead connected to said main output lead; first and second amplifier means each having an input lead connected from one of said main leads, and a second reference lead connected to said reference conductor, said first and second amplifier means having first and second output leads, respectively, said amplifier means first and second output leads being connected to said first and second adder input leads, respectively; and means to clamp the outputs of both of said amplifier means to the same constant predetermined potential.

13. A function generator comprising: a main input lead; a main output lead; a reference conductor providing a point of predetermined reference potential; an analog adder having at least first, second, third ... $n^{th}$ input leads, where $n$ is any positive integer, said adder having an output lead connected to said main output lead; first, second, third ... $n^{th}$ amplifier means each having an input lead connected from one of said main leads, said first, second, third ... $n^{th}$ amplifier means having first, second, third ... $n^{th}$ output leads, respectively, said amplifier means first, second, third ... $n^{th}$ output leads being connected respectively to said first, second, third ... $n^{th}$ adder input leads; and means to clamp the outputs of all of said amplifier means to the same constant predetermined potential.

14. A function generator comprising: a main input lead; a main output lead; a reference conductor providing a point of predetermined reference potential; an analog adder having at least first, second third ... $n^{th}$ input leads, where $n$ is any positive integer, said adder having an output lead connected to said main output lead;

first, second, third ... $n^{th}$ amplifier means each having an input lead connected from one of said main leads, said first, second, third ... $n^{th}$ amplifier means having first, second, third ... $n^{th}$ output leads, respectively, said amplifier means first, second, third ... $n^{th}$ output leads being connected respectively to said first, second, third ... $n^{th}$ adder input leads; and means to clamp the outputs of all of said amplifier means to a predetermined potential, said adder having an auxiliary input lead connected from said main input lead.

15. The invention as defined in claim 14, wherein all of said amplifier means have different gains, said clamp means including a single source of potential having one pole connected to said reference conductor, and first, second, third ... $n^{th}$ diodes having one electrode connected from the outputs of said first, second, third ... $n^{th}$ amplifier means, respectively, each of said diodes having its other electrode connected to the other pole of said source of potential, said diodes being poled in a direction to be back biased by said source of potential.

16. The invention as defined in claim 13, wherein all of said amplifier means have different gains, said clamp means including a single source of potential having one pole connected to said reference conductor, and first, second, third ... $n^{th}$ diodes having one electrode connected from the outputs of said first, second, third ... $n^{th}$ amplifier means, respectively, each of said diodes having its other electrode connected to the other pole of said source of potential, said diodes being poled in a direction to be back biased by said source of potential.

* * * * *